United States Patent [19]

Sanford

[11] Patent Number: 5,918,262
[45] Date of Patent: Jun. 29, 1999

[54] FRANGIBLE MICROSPHERE PEAK PRESSURE MEASURING DEVICE AND METHOD OF MAKING SAME

[75] Inventor: Matthew J. Sanford, Bel Alton, Md.

[73] Assignee: The United States of America as represented by the Secretary of the Navy, Washington, D.C.

[21] Appl. No.: 08/941,934

[22] Filed: Sep. 30, 1997

[51] Int. Cl.⁶ .................................................. G01L 23/00
[52] U.S. Cl. .......................... 73/35.14; 73/167; 73/11.01; 116/203
[58] Field of Search .................................. 73/35.14, 167, 73/11.01, 12.01, 12.08; 116/203

[56] References Cited

U.S. PATENT DOCUMENTS

| 3,373,716 | 3/1968 | Williams | 116/114 |
| 3,577,762 | 5/1971 | Hornbogen et al. | 73/12 |
| 5,242,830 | 9/1993 | Argy et al. | 436/5 |

*Primary Examiner*—Joseph L. Felber
*Attorney, Agent, or Firm*—James B. Bechtel, Esq.

[57] ABSTRACT

Peak pressure of a shock wave can be measured by a plurality of frangible microspheres of known fracture pressures. The microspheres are sized to be surrounded by the shock wave as the shock wave travels thereby. The microspheres remaining intact after the shock wave passes provide a measure of peak pressure.

14 Claims, 3 Drawing Sheets

FRANGIBLE MICROSPHERE PEAK PRESSURE MEASURING DEVICE AND METHOD OF MAKING SAME

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to peak pressure measuring devices, and more particularly to a device for measuring and/or mapping the peak pressure of a shock wave using frangible microspheres, and a method for making such a device.

BACKGROUND OF THE INVENTION

As is known in the art, whether occurring in water, air or in the ground, explosive events are typically characterized by a propagating shock wave having a peak pressure that diminishes exponentially with distance from the point of explosion. Measurement of the peak pressure is difficult and/or expensive to achieve because the width of an explosion-created shock wave is very narrow in width. For example, a typical explosion-created shock wave in air has a pulse width on the order of 3 millimeters and, in water, has a pulse width on the order of only 1 millimeter. The measurement portion of mechanical pressure gauges is typically larger than this pulse width thereby making such gauges incapable of accurately measuring the peak pressure. Electronic pressure gauges, although more accurate than the mechanical gauge, are more expensive.

Further, both mechanical and electronic gauges are only capable of measuring pressure at a point. However, when studying explosive events, it is frequently necessary to know what happens to the peak pressure of the shock wave at a variety of locations away from the point of explosion. Unfortunately, the expense of using a plurality of mechanical or electronic gauges causes the cost of measurement to increase dramatically.

SUMMARY OF THE INVENTION

Accordingly, it is an object of the present invention to provide a device for measuring the peak pressure of an explosive event.

Another object of the present invention is to provide a device for measuring the peak pressure of an explosive event's shock wave at a variety of locations away from the point of explosion.

Still another object of the present invention is to provide a device for mapping the peak pressure of a shock wave at a variety of locations.

Yet another object of the present invention is to provide a device for measuring the peak pressure of a shock wave propagating in water, air or in the ground.

A further object of the present invention is to provide a device for measuring peak pressure that is inexpensive and simple to manufacture.

A still further object of the present invention is to provide a method of manufacturing a device that measures peak pressure of an explosive-event's shock wave.

Other objects and advantages of the present invention will become more obvious hereinafter in the specification and drawings.

In accordance with the present invention, peak pressure of a shock wave can be measured by a plurality of frangible microspheres of known fracture pressures. The microspheres are sized to be surrounded by the shock wave as the shock wave travels thereby. The microspheres are positioned in the path of the shock wave at a known distance from a source generating the shock wave. After the shock wave has passed, a portion of the microspheres are fractured and a remainder thereof remain intact. The locations of the remainder provide a measure of peak pressure of the shock wave. Deployment of the microspheres can be facilitated by adhering the microspheres to a substrate. A method of making the device on a substrate is also provided.

DETAILED DESCRIPTION OF THE INVENTION

The present invention provides a means of measuring and/or mapping the peak pressure associated with a shock wave. For purposes of description, the shock waves of interest are created by an explosive event occurring in either air, water or in the ground. However, it is to be understood that the present invention is not limited to operation with shock waves brought on by an explosive event.

Figure 1:
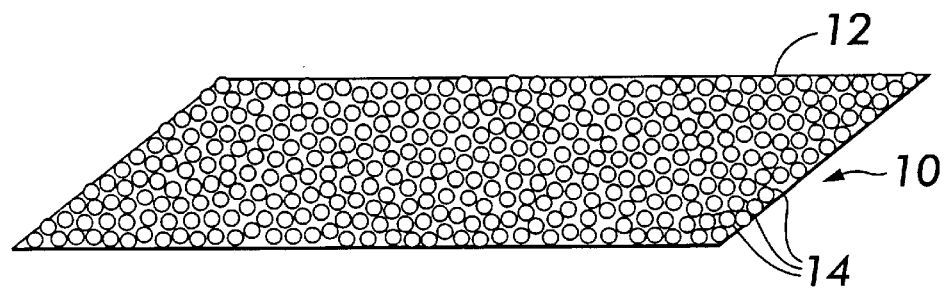
FIG. 1 is a schematic view of one embodiment of the present invention configured for measuring a shock wavers peak pressure as a function of distance from the source of the shock wave.

Referring now to the drawings, and more particularly to FIG. 1, one embodiment of a peak pressure measuring device according to the present invention is shown and referenced generally by numeral 10. Device 10 includes a substrate 12 preferably having a single layer of frangible microspheres 14 adhered to substrate 12. Substrate 12 can be rigid or flexible and can range from a single line to a broad sheet of material. It may be desirable to use a material for substrate 12 that has an acoustic impedance that approximates that of the medium of shock wave transmission. For example, if the shock wave is to be transmitted/measured in water, substrate 12 can be a polyurethane having an acoustic impedance similar to that of water. Note that poor acoustic matching between substrate 12 and the medium of shock wave transmission may cause unwanted wave reflections at the surface of substrate 12.

Each microsphere 14 is made of a material that implodes or shatters when exposed to a threshold level of compression referred to hereinafter as fracture pressure. Materials used to make such microspheres typically include glass and plastic. However, the preference in the present invention is to use glass for microspheres 14 since glass microspheres clearly shatter at their fracture pressure whereas plastic microspheres may just deform at their fracture pressure.

For purpose of the present invention, it is important that the fracture pressure for microspheres 14 be known. For device 10, it is assumed that the fracture pressure for each of microspheres 14 is the same. Methods for determining and assuring the reliability of this quantity will be discussed further below in the description of how to manufacture device 10. It is also important in the present invention that microspheres 14 be sized such that each microsphere 14 can fit within or be surrounded by a shock wave of interest. For example, as mentioned above, the pulse width of a shock wave created by an underwater explosive event is on the order of 1000 microns or 1 millimeter. In order to detect the peak pressure of the shock wave (which occurs at the narrowest portion of the shock wave), each microsphere 14 should be an order of magnitude (e.g., one-tenth) less than the pulse width of the shock wave. Thus, for a shock wave on the order of 1000 microns in width, microspheres 14 should be approximately 100 microns or less in diameter. The smaller the size of microspheres 14, the greater the measurement resolution in terms of sensitivity to the absolute peak pressure.

Figure 2A:
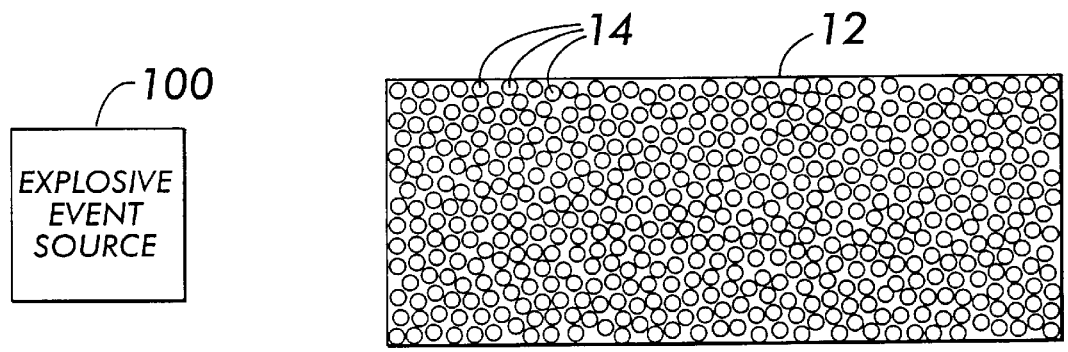
FIG. 2A is a schematic view of the present invention configured and deployed to measure the distance over which a particular peak pressure is maintained.
Figure 2B:
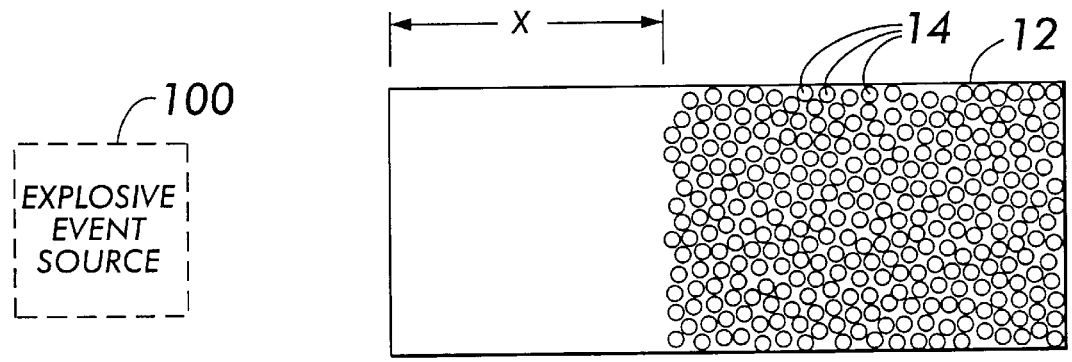
FIG. 2B is a schematic view of the device in FIG. 2A after the explosive event has occurred.

The types of measurements that can be made with the present invention can vary with both the configuration of the device and its placement relative to the source of an explosive event. For example, as shown in FIG. 2A, the source of the explosive event is referenced by numeral 100, substrate 12 is a strip extending away from source 100 and microspheres 14 all have the same fracture pressure. Configured and deployed in this fashion, the present invention can measure the distance over which a particular peak pressure was maintained. In use, when source 100 generates a shock wave, a portion of microspheres 14 will shatter whenever the shock wave peak pressure exceeds the fracture pressure of microspheres 140 Once the peak pressure falls below the fracture pressure, the remainder of microspheres 14 remain intact. This is shown in FIG. 2B where no microspheres are left intact on substrate 12 for a distance X from source 100 while microspheres 14 are still intact beyond distance X.

Figure 3A:
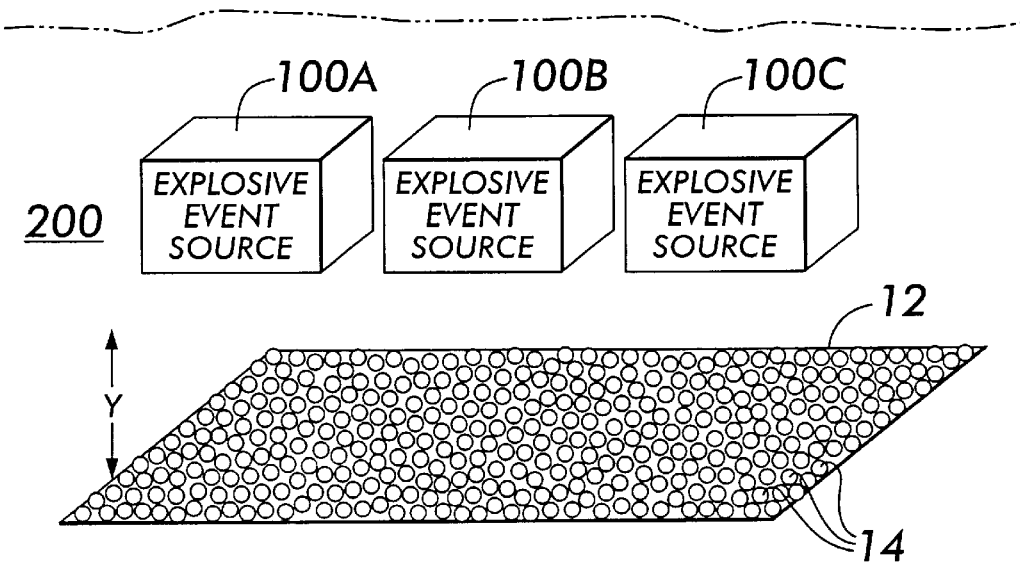
FIG. 3A is a schematic view of the present invention configured and deployed in the ground to map the zone over which a particular peak pressure will be delivered by a plurality of explosive events.
Figure 3B:
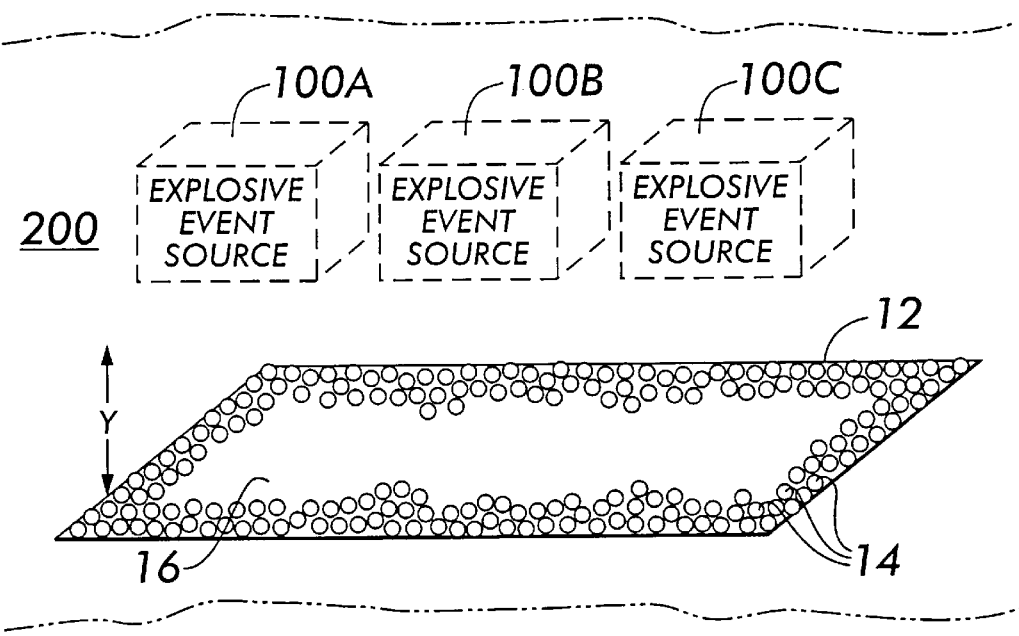
FIG. 3B is a schematic view of the device in FIG. 3A after the explosive events have occurred.

Another configuration and deployment option is shown in FIG. 3A where several sources of explosive events 100A, 100B and 100C are deployed in the ground 200, substrate 12 is a sheet buried in ground 200 a distance Y beneath sources 100A, 100B and 100C, and microspheres 14 all have the same fracture pressure In use, when sources 100A, 100B and 100C explode and generate their respective shock waves, a portion of microspheres 14 on substrate 12 are shattered within, for example, the zone shown in FIG. 3B referenced by numeral 16. The remainder of microspheres 14 outside of zone 16 remain intact.

The mapping of zone 16 is important because the outputs of multiple explosive sources occur at slightly different times, reflect off various interfaces; (e.g., water surface, sea bottom, etc.), and travel at different rates through the various medium (e.g., water, sand, etc.). The various shock waves interact with waves traveling from other sources and on different paths resulting in either constructive or destructive interference. This creates the possibility of dead zones into which no shock energy is delivered. Thus, a shock wave map of an area provides insight into a medium's transmission characteristics.

Figure 4A:
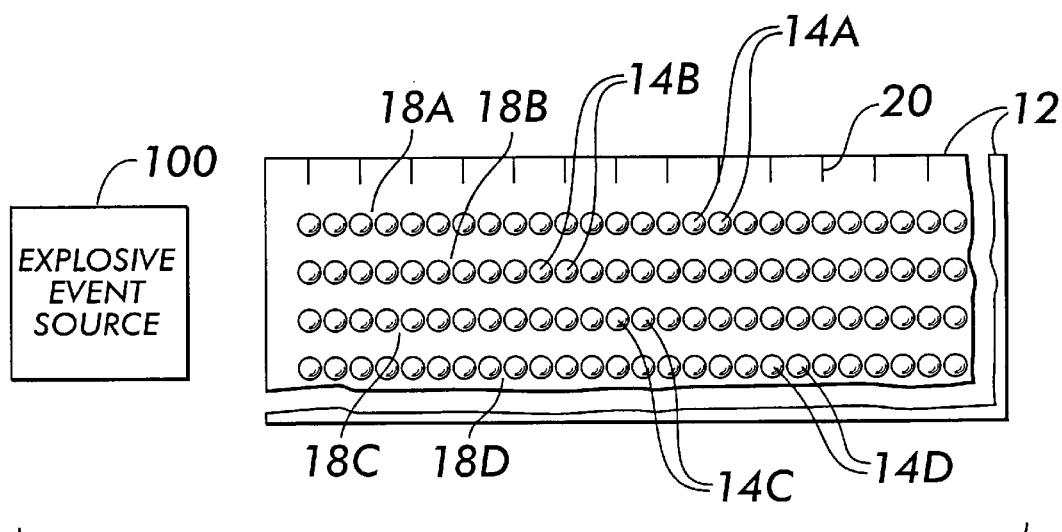
FIG. 4A is a schematic view of another embodiment of the present invention configured and deployed to measure how the peak pressure diminishes as a function of distance from the source of a shock wave.
Figure 4B:
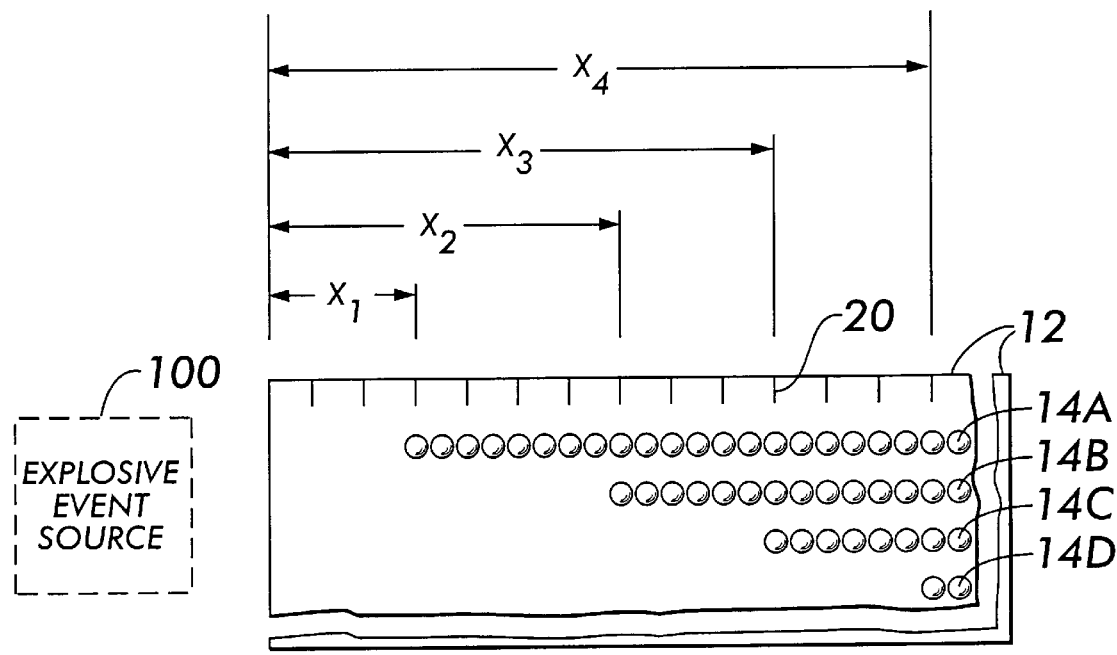
FIG. 4B is a schematic view of the device in FIG. 4A after the explosive event has occurred.

Still another configuration and deployment option is shown in FIG. 4A where substrate 12 is a strip extending away from source 100 and the microspheres are arranged in rows along the length of substrate 12. For example, a first row 18A has microspheres 14A all of which have the same fracture pressure (e.g., 15,000 psi). A second row 18B has microspheres 14B all of which have the same fracture pressure, but one that is different from microspheres 14A (e.g., 10,000 psi). Similarly, a third row 18C could have microspheres 14C having a fracture pressure of, for example, 1000 psi while a fourth row 18D could have microspheres 14D having a fracture pressure of, for example, 100 psi. More or fewer rows could be provided on substrate 12, each of which would have its own unique fracture pressure associated therewith. In use, when source 100 explodes and generates a shock wave thereby, each row of microspheres on substrate 12 will indicate a different location at which its respective microspheres remain intact. This is shown in FIG. 4B where $X_1$ represents the distance over which the peak pressure was maintained at (in this example) 15,000 psi or greater, $X_2$ represents the distance over which the peak pressure was maintained at 10,000 psi or greater, $X_3$ represents the distance over which the peak pressure was maintained at 1000 psi or greater, and $X_4$ represents the distance over which the peak pressure was maintained at 100 psi or greater. Obviously, the greater the number of rows of differing fracture pressure, the greater the measurement resolution. In addition, substrate 12 could include measurement indicia (indicated by reference numeral 20) to eliminate the need to measure the various X-values with a separate measuring device.

The advantages of the present invention are numerous. Peak pressures can be detected, measured and/or mapped by a device that is easily configured and deployed. The small size and spherical shape of the microspheres allows them to fit within the pressure envelope of a shock wave. The size of the microspheres and the strength characteristics provided by their spherical shape allows the present invention to advantageously exhibit a clear break/no break record dependent upon the peak pressure of the shock wave. Further, the small size of the microspheres makes the peak pressure measurement independent of the medium in which the shock wave is propagating and independent of shock direction. If the microspheres were larger than the pressure envelope, they could reflect the shock wave so that a breakage pattern might no longer correspond only to pressure.

The method of manufacturing the present invention will now be explained. Glass microspheres are available commercially in a variety of sizes (down to tens of microns) in terms of both diameter and wall thickness. The isostatic pressure strength of the microspheres is dependent upon the diameter and wall thickness and can range from 100 to 15,000 psi for commonly-available sizes. However, any given batch of microspheres can contain microspheres having a range of fracture pressures. Since it is important for the microspheres used in the present invention to be of known fracture pressure, the method of manufacture must provide a high degree of integrity with respect to this property. Further, any given batch of microspheres can contain broken fragments of glass. Since it is important in the present invention to clearly delineate between broken and unbroken microspheres in order to measure peak pressure, devices constructed in accordance with the present invention should not be manufactured with any broken microsphere fragments.

With respect to removing broken fragments from a batch of microspheres, the batch can be placed in a liquid bath, e.g., water. The broken fragments will sink to the bottom of the bath while the unbroken microspheres will remain suspended or buoyant in the bath. Also, various methods (e.g., the introduction of ultrasound) can be used to agitate the microspheres in the liquid to both disperse the microspheres and break up clumps of broken and unbroken microspheres. The bath can then be carefully skimmed so that only unbroken microspheres will be used.

To achieve a level of confidence in the fracture pressure of a batch or to separate a batch into several known fracture pressures, one or more processes can be performed. For example, a batch of microspheres can be filtered through a series of different sized porous media in order to group the microspheres by diameter size. However, since wall thickness also affects the fracture pressure property, it may be necessary to pre-pressure test some sample groups of microspheres to obtain a minimum fracture pressure or a distribution of fracture pressure for each sample group. This could be done by examining the pressure/volume relationship of a sample group in water. To do this, the sample group could be loaded into a water-filled test cell sealed by a piston. As pressure increased in the water by means of the piston, force and displacement data combined with the geometry of the test cell could provide a pressure/volume curve for the sample group showing the pressure range required to fracture the microspheres.

Once the microspheres are sorted by size and fracture pressure, the device of the present invention can be manufactured in one of several ways. For example, the substrate can have an adhesive thereon wherever it is desired to have microspheres. The substrate is then dipped into a vat of sorted and/or pressure-tested microspheres. After dipping, excess microspheres can be blown off leaving just a single layer of microspheres adhered to the substrate. Another manufacturing option is to mix sorted and/or pressure-tested microspheres with a liquid adhesive. The mixture could then be sprayed onto the substrate of choice.

Although the invention has been described relative to a specific embodiment thereof, there are numerous variations and modifications that will be readily apparent to those skilled in the art in light of the above teachings. For example, while the use of a substrate facilitates placement of the microspheres, the substrate is not necessarily required. The microspheres could be positioned directly on the ground at a variety of locations from the source of a shock wave. The microspheres could also be placed throughout a vehicle (e.g., car, airliner, etc.) during or after its construction. Reconstruction of a vehicle accident could then be based on which microspheres were broken and their breaking pressure. This would be an inexpensive way to obtain a record of events. It is therefore to be understood that, within the scope of the appended claims, the invention may be practiced other than as specifically described.

What is claimed as new and desired to be secured by letters patent of the united states is:

1. A device for measuring peak pressure of a shock wave comprising:
    a flexible material positioned in the path of said shock wave at a known distance from a source generating said shock wave; and
    a plurality of frangible microspheres adhered to said flexible material, each of said plurality of frangible microspheres having a known fracture pressure and sized to be surrounded by said shock wave as said shock wave travels thereby, wherein a portion of said plurality of frangible microspheres fractures as said shock wave travels thereby and a remainder of said plurality of frangible microspheres remains intact as said shock wave travels thereby, and wherein locations of said remainder provide a measure of peak pressure of said shock wave.

2. A device as in claim 1 wherein each of said plurality of frangible microspheres is made of glass.

3. A device as in claim 1 wherein said plurality of frangible microspheres are arranged in rows characterized by those of said plurality of frangible microspheres having the same said fracture pressure.

4. A device as in claim 3 wherein a unique said fracture pressure is associated with each of said rows.

5. A device as in claim 1 wherein said shock wave travels in water, and wherein said flexible material has an acoustic impedance that is approximately the same as the acoustic impedance of water.

6. A method of making a device for measuring peak pressure of a shock wave, comprising the steps of:
    providing a plurality of glass microspheres characterized by at least one known fracture pressure;
    distributing said plurality of glass microspheres on a piece of flexible material; and
    adhering said plurality of glass microspheres to said piece of flexible material.

7. A method according to claim 6 further comprising the step of removing broken pieces of glass.

8. A method according to claim 7 wherein said step of removing comprises the step of placing said plurality of glass microspheres in a liquid bath wherein said broken pieces sink to the bottom of said liquid bath.

9. A method according to claim 6 further comprising the step of grouping said plurality of glass microspheres according to fracture pressure thereof.

10. A method according to claim 6 wherein said step of distributing comprises the step of forming rows of portions of said plurality of glass microspheres having the same said fracture pressure.

11. A method according to claim 6 wherein said step of distributing and adhering are accomplished simultaneously.

12. A method according to claim 11 wherein said piece of flexible material is coated with adhesive, and wherein said steps of distributing and adhering comprise the step of dipping said piece of flexible material into said plurality of glass microspheres.

13. A method according to claim 11 wherein said steps of distributing and adhering comprise the steps of:
    mixing said plurality of glass microspheres with a liquid adhesive to form a microsphere/adhesive mixture; and
    spraying said microsphere/adhesive mixture onto said piece of flexible material.

14. A method according to claim 6 further comprising the step of pressure testing said plurality of glass microspheres to determine a minimum fracture pressure therefor.

* * * * *